(12) United States Patent  
Aryanfar et al.

(10) Patent No.: US 9,285,457 B2  
(45) Date of Patent: Mar. 15, 2016

(54) HIGH-ACCURACY DETECTION IN COLLABORATIVE TRACKING SYSTEMS

(71) Applicant: Silicon Image, Inc., Sunnyvale, CA (US)

(72) Inventors: Farshid Aryanfar, Allen, TX (US); Jihong Ren, Sunnyvale, CA (US)

(73) Assignee: Lattice Semiconductor Corporation, Portland, OR (US)

(*) Notice: Subject to any disclaimer, the term of this patent is extended or adjusted under 35 U.S.C. 154(b) by 297 days.

(21) Appl. No.: 13/726,822

(22) Filed: Dec. 26, 2012

(65) Prior Publication Data

US 2013/0162460 A1 Jun. 27, 2013

Related U.S. Application Data

(60) Provisional application No. 61/580,508, filed on Dec. 27, 2011.

(51) Int. Cl.
*G01S 5/02* (2010.01)
*G01S 13/76* (2006.01)

(52) U.S. Cl.
CPC .......... *G01S 5/0294* (2013.01); *G01S 13/767* (2013.01); *A63F 2300/204* (2013.01)

(58) Field of Classification Search
CPC ...... G01S 13/00; G01S 13/767; G01S 5/0294
USPC .......................................................... 342/42
See application file for complete search history.

(56) References Cited

U.S. PATENT DOCUMENTS

| 5,822,683 A * | 10/1998 | Paschen ............... B61L 25/045 340/10.34 |
| 7,030,805 B2 | 4/2006 | Ormesher et al. ............. 342/42 |
| 7,925,224 B2 | 4/2011 | Pinkney ........................ 455/88 |
| 2002/0063622 A1* | 5/2002 | Armstrong et al. ........ 340/10.31 |
| 2004/0178944 A1 | 9/2004 | Richardson et al. ......... 342/43 |
| 2010/0214214 A1* | 8/2010 | Corson et al. ................ 345/158 |
| 2011/0234399 A1* | 9/2011 | Yan ....................... G08B 21/24 340/539.32 |

* cited by examiner

*Primary Examiner* — Timothy A Brainard
(74) *Attorney, Agent, or Firm* — Fenwick & West LLP

(57) ABSTRACT

An electronic device for wirelessly tracking the position of a second electronic device is disclosed. The electronic device includes transceiver circuitry and processing circuitry. The transceiver circuitry includes a beacon generator to generate a beacon at a particular frequency and direction. An antenna array transmits the beacon, and receives at least one modulated reflected beacon from the second electronic device. The transceiver circuitry also includes a discriminator to discriminate between received modulated reflected beacons and received reflected interfering beacons. The processing circuitry couples to the transceiver circuitry and tracks the position of the second device based on the modulated reflected beacons.

15 Claims, 8 Drawing Sheets

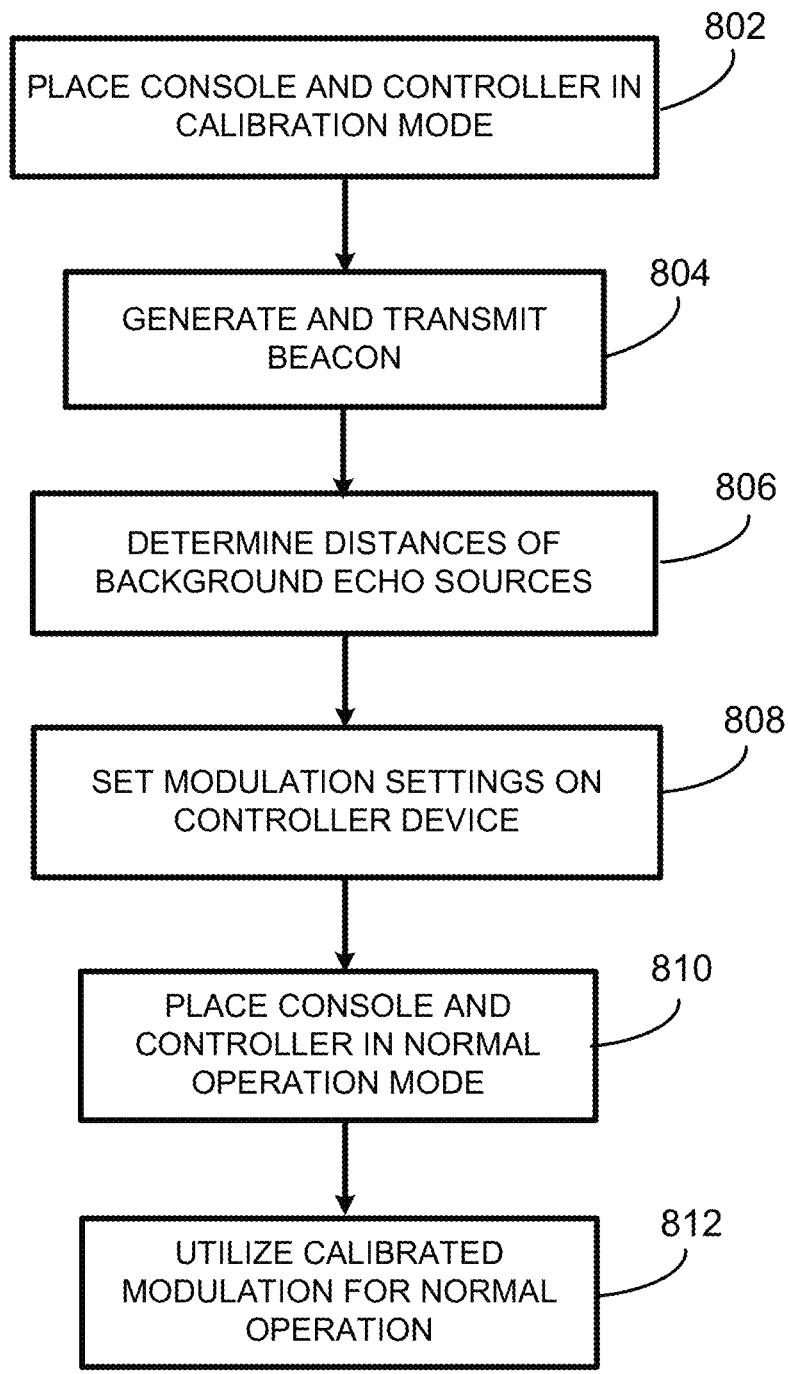

HIGH-ACCURACY DETECTION IN COLLABORATIVE TRACKING SYSTEMS

RELATED APPLICATIONS

This application claims the benefit of priority under 35 U.S.C. §119(e) to Provisional Application Ser. No. 61/580, 508, filed Dec. 27, 2011, titled HIGH-ACCURACY DETECTION IN COLLABORATIVE TRACKING SYSTEMS, which is incorporated herein by reference in its entirety.

TECHNICAL FIELD

The disclosure herein relates to wireless communication systems and methods and more particularly to tracking systems and methods that establish the location of a target electronic device with respect to a tracking electronic device.

BACKGROUND

Millimeter-wave signaling links are gaining in popularity, especially in the wireless context. Corresponding to operating frequencies in the range of around 30 to 300 GHz, transmission and reception of RF signals along the links are often realized through use of directional antennas. Such antennas are capable of steering beams between devices to effect data communications over the resulting wireless link.

In situations where tracking depends upon reflections from the target device, background reflections and other sources of noise may cause problems for detection circuitry that needs to discriminate between the target reflections of interest, and the unimportant background noise. For consumer electronic products where the tracking device and the target device may be in close proximity, discriminating between the target reflections and background echoes is a difficult problem to overcome while still maintaining low power budgets.

Thus, the need exists for improved wireless device tracking schemes.

BRIEF DESCRIPTION OF THE DRAWINGS

Embodiments of the disclosure are illustrated by way of example, and not by way of limitation, in the figures of the accompanying drawings and in which like reference numerals refer to similar elements and in which:

FIG. 2b illustrates a block diagram of a further embodiment of transceiver circuitry and antenna interface circuitry similar to FIG. 2a;

FIG. 8 illustrates a flow diagram of a calibration method for setting a modulation value at the target device to enhance reflected beacon discrimination;

DETAILED DESCRIPTION

Figure 1:
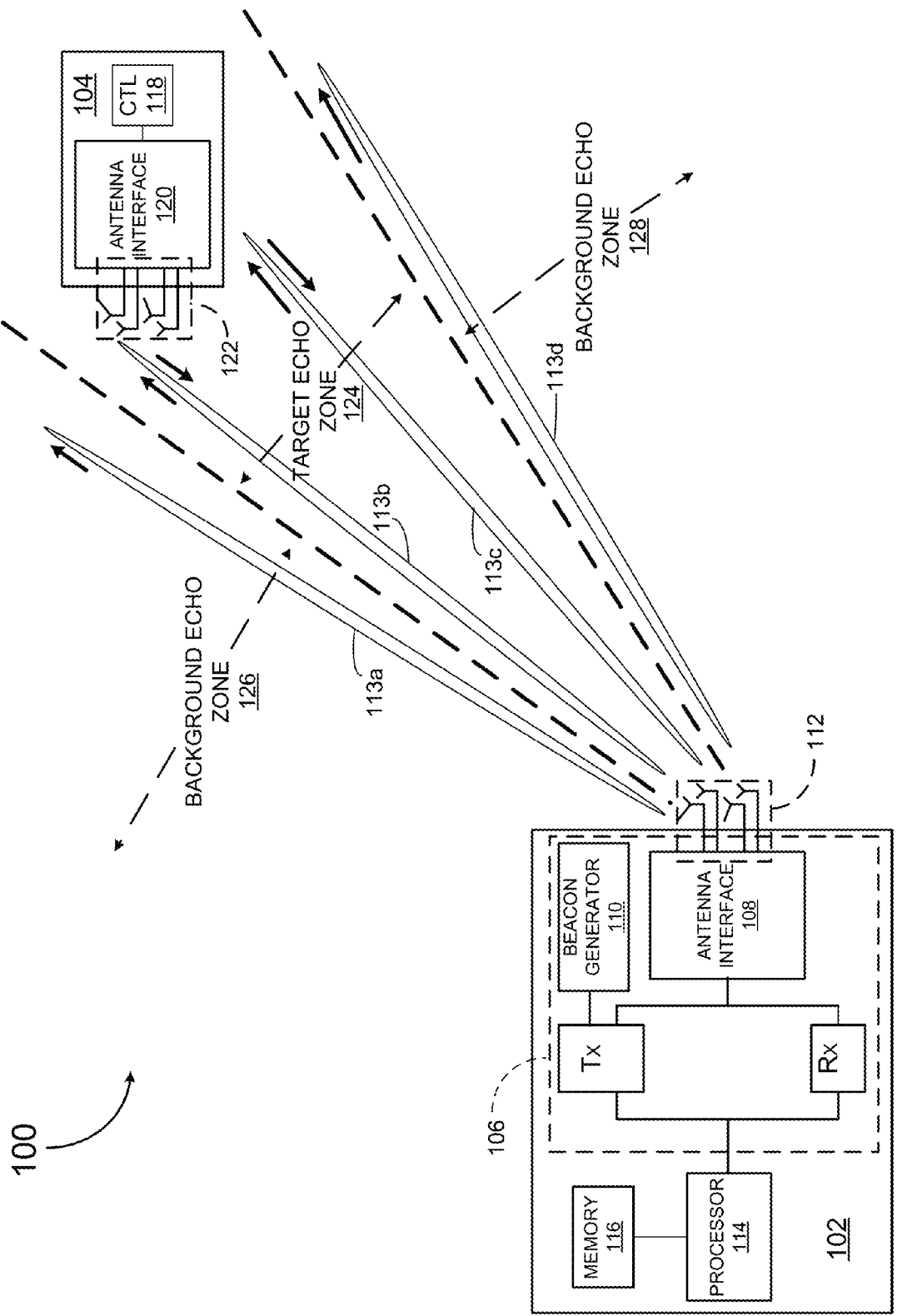
FIG. 1 illustrates a block diagram of one embodiment of a tracking system employing a target device and a tracking device.

Embodiments of an electronic device for wirelessly tracking the position of a second electronic device are disclosed. In one embodiment, the electronic device includes transceiver circuitry and processing circuitry. The transceiver circuitry includes a beacon generator to generate a beacon at a particular frequency and direction. An antenna array transmits the beacon, and receives at least one modulated reflected beacon from the second electronic device. The modulated reflected beacon is received if a position of the second electronic device lies within a range of directions of the beacon. The transceiver circuitry also includes a discriminator to discriminate between received modulated reflected beacons and received reflected interfering beacons. The processing circuitry couples to the transceiver circuitry and tracks the position of the second device based on the modulated reflected beacons.

In another embodiment, a wireless target device for collaborating with a wireless tracking device is disclosed. The wireless target device includes a reflective antenna to reflect an incoming directional beacon transmitted from the tracking device. The reflective antenna reflects the beacon back to the tracking device. Modulation circuitry on the wireless target device modulates the reflected beacon.

In a further embodiment, a wireless link for establishing the position of a second device with respect to a first device is disclosed. The wireless link includes a first transceiver circuit in the first device that has a beacon generator to generate the beacon at a particular frequency and direction. The first transceiver circuit further includes an antenna and a discriminator. The antenna transmits the beacon and, where the second device lies within a range of directions of the beacon, receives a modulated reflected beacon. The discriminator discriminates between the received modulated reflected beacon and received reflected interfering beacons. A second transceiver circuit in the second device includes a reflective antenna to receive the beacon from the direction and modulate and reflect the beacon as the modulated reflected beacon in an opposite direction.

In another embodiment, an electromagnetic signal used in the detection of a target device is disclosed. The electromagnetic signal includes a beacon reflection based on a first beacon of a first direction transmitted from a tracking device. The beacon reflection exhibits a reflection modulation upon reflection from the target device and propagates at a direction opposite the first direction.

In yet another embodiment, a method of tracking a second electronic device with respect to a first electronic device is disclosed. The method includes, at the first device, generating a directional beacon and transmitting the directional beacon from the first electronic device. The first device later receives a modulated reflected beacon corresponding to the transmitted beacon when the second electronic device lies within a range of directions of the beacon. Background reflections of the directional beacon are also received at the first device, and the received beacons processed to discriminate between the background reflected beacons and the modulated reflected beacon.

System Overview

Referring now to FIG. 1, one embodiment of a wireless device tracking system, generally designated 100, includes a tracking device 102 that wirelessly tracks the position of a target device 104. The tracking device 102 in one embodiment comprises a game console unit that employs transceiver and antenna circuitry 106 to emit and receive reflected waveforms that are realized in one embodiment as beacons. The beacons, also often referred to as "pilots", are steered beams having a defined carrier frequency and one or more directional components. In specific embodiments, the carrier frequencies correspond to mm-wave wavelengths. The transceiver and antenna circuitry 106 employs transmit circuitry Tx and receiver circuitry Rx to carry out respective transmit and receive operations via an antenna interface 108. Coupled to the antenna interface 108 is a beacon generator 110 that generates a beacon for emission at a desired frequency and direction by the antenna interface 108. An antenna 112 connects to the antenna interface 108 and emits the generated beacons, and receives reflected beacons. Computer processing resources in the form of a processor 114 such as a central processing unit (CPU) or a graphics processing unit (GPU) couples to the transceiver and antenna circuitry 106 to carry out compute tasks in response to software loaded into a memory 116. Further memory may interface with the processor 114 to provide additional data storage capabilities for information such as direction and offset frequencies relating to received beacons.

Further referring to FIG. 1, the target device 104 in one embodiment comprises a mobile device, such as a hand-held game controller or mobile phone. The target device 104 employs a control circuit 118 that couples to an antenna interface 120. An antenna 122 connects to the antenna interface to, in one embodiment, redirect or reflect beacons emitted from the tracking device 102 back to the target device 104 as noted below.

With continued reference to FIG. 1, in a transmit mode according to one embodiment, the tracking device antenna 112 emits beacons 113a-113d at various directions and frequencies as governed by the beacon generator 110 and antenna interface 108. Generally, beacons transmitted within a range of directions generally spanning a line-of-sight path between the tracking device 102 and the target device 104, referred to as an echo zone 124, are reflected back to the tracking device 102 and, in a receive mode, provide directional information concerning the target device as explained more fully below. Beacons transmitted outside the echo zone, in areas denoted non-echo zones 126 and 128, are not directly reflected by the target device, and provide little to no target direction information. However, for applications where the controller or mobile phone may be located near walls or other reflective surfaces, background reflections may cause undesirable noise and clutter, making detection of the directly reflected beacon from the controller a difficult task. As more fully described below, the controller enhances its own detection in a collaborative manner with the tracking device by modulating reflections so that they may be easily detectable in the presence of interference.

Figure 2A:
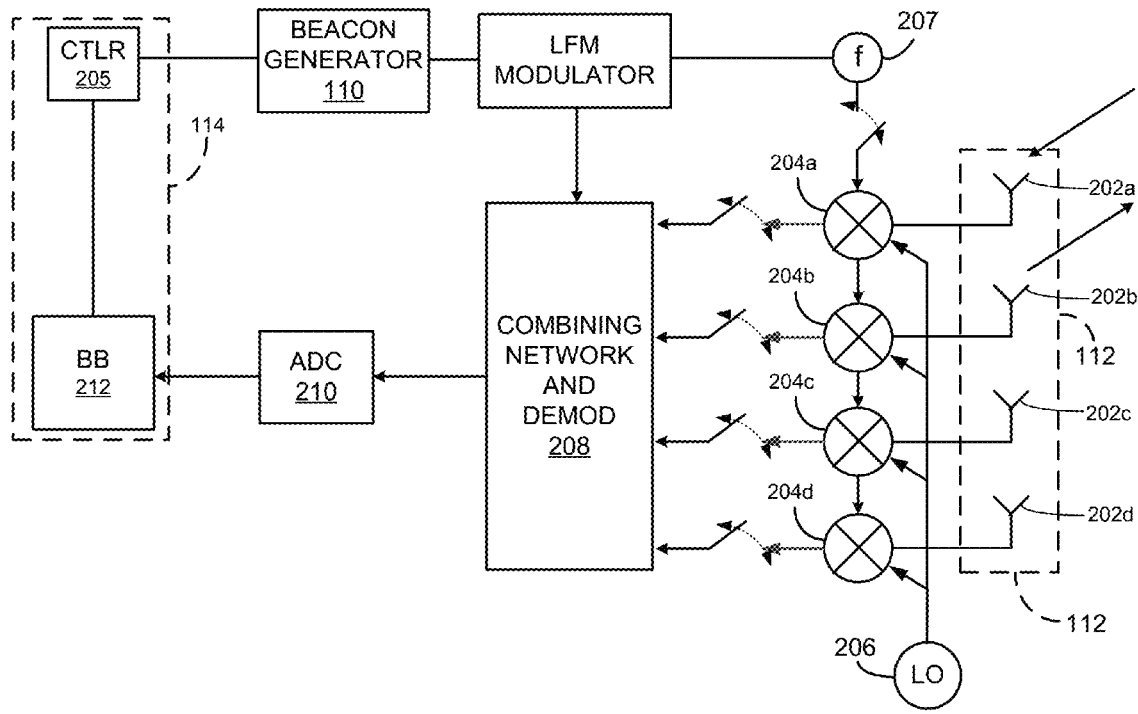
FIG. 2a illustrates a block diagram of one embodiment of transceiver circuitry and antenna interface circuitry within the tracking electronic device of FIG. 1.

FIG. 2a illustrates further detail regarding the transceiver and antenna circuitry 106 of FIG. 1. The antenna 112 in one embodiment takes the form of a directional antenna that incorporates a multi-dimensional array of antenna elements 202a-202d, defining a phased array antenna. Unlike omnidirectional antennas that have a uniform gain in all directions, a directional antenna has a different antenna gain in each direction. The elements may be configured to, for example, output and/or receive signals in a 7 GHz frequency band centered on 60 GHz (or on a frequency range between 30 and 300 GHz). While the entire phased array antenna may be monolithically formed on an integrated circuit chip, the antenna array 112 may be disposed external to the transceiver and antenna circuitry 106, formed on-chip, on a chip package, on an interposer, or chip carrier, on substrate, and/or on another integrated circuit (for example, in a chip stack).

Further referring to FIG. 2a, a plurality of mixers 204a-204d are respectively coupled to the plurality of antenna elements 202a-202d. The mixers 204a-d are coupled to a local oscillator 206 that generates a local oscillator signal at an oscillation frequency $f_{LO}$. A reference signal generator 207 produces a reference signal having a frequency f0 and feeds the signal to the mixers in a manner similar to the local oscillator signal, but phase-shifted by a controlled amount to each mixer.

Figure 5:
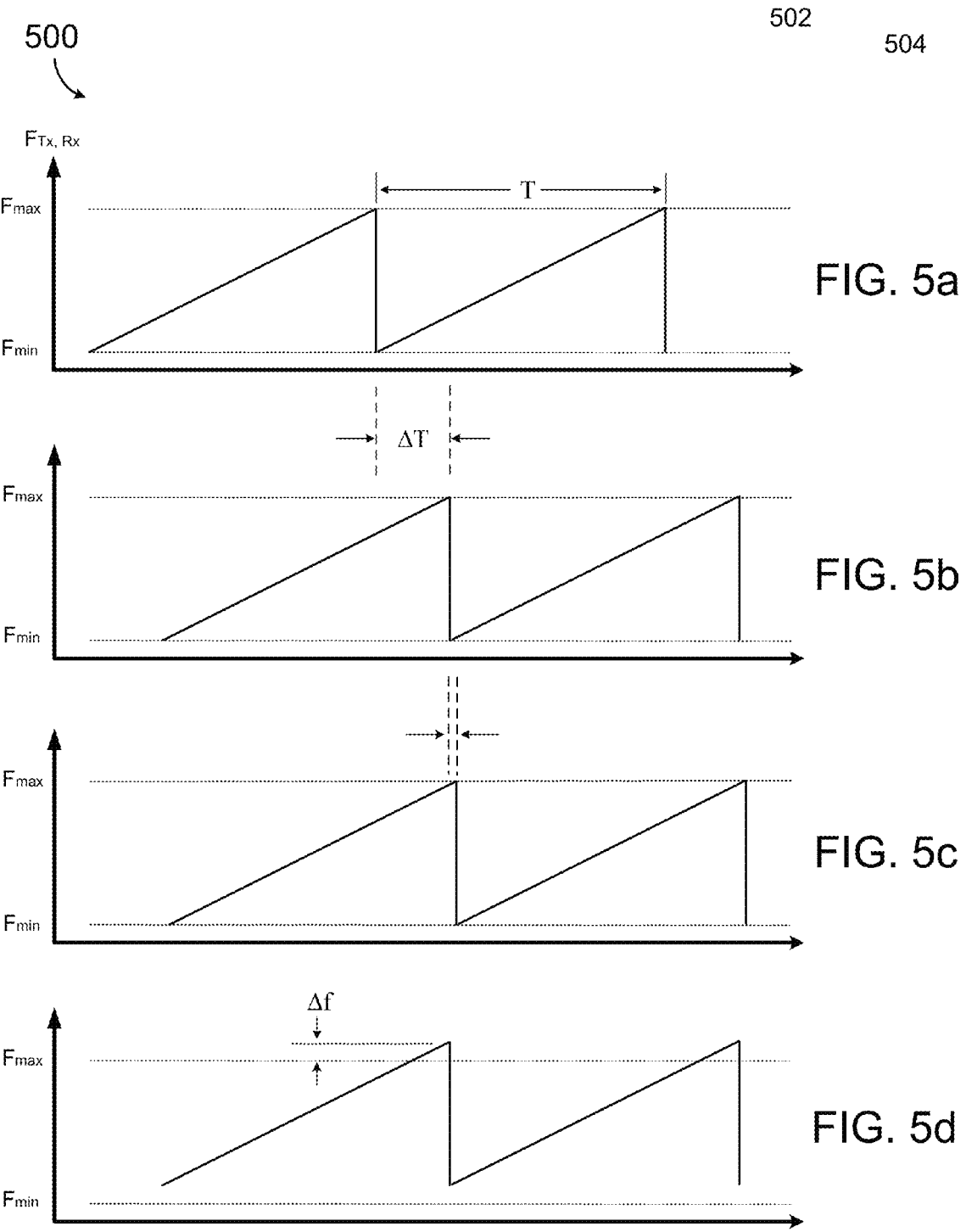
FIGS. 5a-5d illustrate graphical representations of transmitted and received beacon waveforms in the frequency domain for determining a target device's position.

With continued reference to FIG. 2a, the reference signal generator receives modulated beacon signals from a linear frequency modulator (LFM) 211. The modulator takes beacon signals generated by the beacon generator 110, and modulates them by linearly changing the beacon signal frequency from a minimum frequency value to a maximum frequency value over a given time interval. One example of this form of modulation is the CHIRP spread spectrum (CSS) form of modulation. Modulating in this manner allows for greater accuracy in detecting reflected beacons as will be shown later with respect to FIGS. 5 and 6.

As explained above, during transmission modes of operation, the mixers 204a-d are coupled to the beacon generator 110 via the LFM modulator 211. The beacon generator generates beacons and directional components in response to a controller circuit 205 that in one embodiment forms a portion of the processor resources 114 of FIG. 1. For reflected beacon reception, the mixers 204a-d down-convert the received RF carrier signal using the local oscillation signal $f_{LO}$ to generate a signal exhibiting an intermediate frequency $f_{IF}$ that is a lower frequency than the carrier frequency, and thus more easily handled from a processing standpoint.

With continued reference to FIG. 2a, in one embodiment the mixers 204a-d are selectively coupled to a combining network 208, depending on whether the antenna is operating in a transmit or receive mode. The combining network in a receive mode, generally takes the intermediate frequency receive signals from the mixers 204a-d, and combines the separate phase components from the different antenna elements into a composite waveform based on calibration coefficients stored in a memory, such as a look-up table, or data storage 116. Target device reflections are then extracted from the received signal from interfering reflections by a discriminator, such as a correlator with variable delay, and then are further processed to determine the target device location. In a transmit mode, the combining network 208 receives directional components from the beacon generator and acts to effectively steer the orientation of signal transmission by assigning a different phase angle offset to signals transmitted by each of the antenna elements 202a-d. In some embodiments, the combining network 208 may be simplified or altogether omitted by including circuitry within the mixers 204a-d to carry out the phase shifting functionality.

Disposed at a receive output of the combining network 208 is an analog-to-digital converter (ADC) 210 to convert the reflections into digital data streams for processing by the processor resources. The ADC includes an input for receiving waveforms representing reflected beacon signals and an output signal to a baseband processor (BB) 212. The baseband processor 212 may be realized by the processing circuitry resources 114 described earlier and coupled to the controller circuit 205.

Figure 2B:
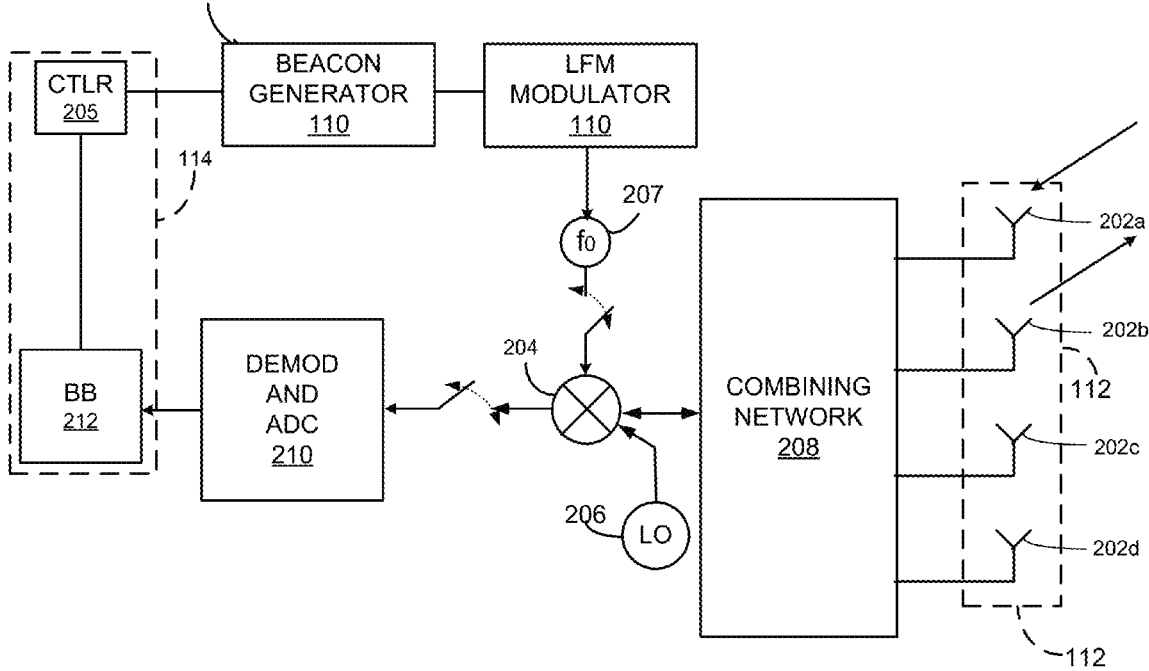

Alternatively, as shown in FIG. 2b, one mixer 204 is coupled to the plurality of antenna elements 202a-202d through the combining network 208. The mixer 204 is coupled to a local oscillator 206 that generates a local oscillator signal at an oscillation frequency $f_{LO}$. A reference signal generator 207 produces a reference signal having a frequency f0 and feeds the signal to the mixers in a manner similar to the local oscillator signal. The combining network in this case applies a controlled amount of phase-shift between the mixer and each antenna element 202a-202d.

Figure 3:
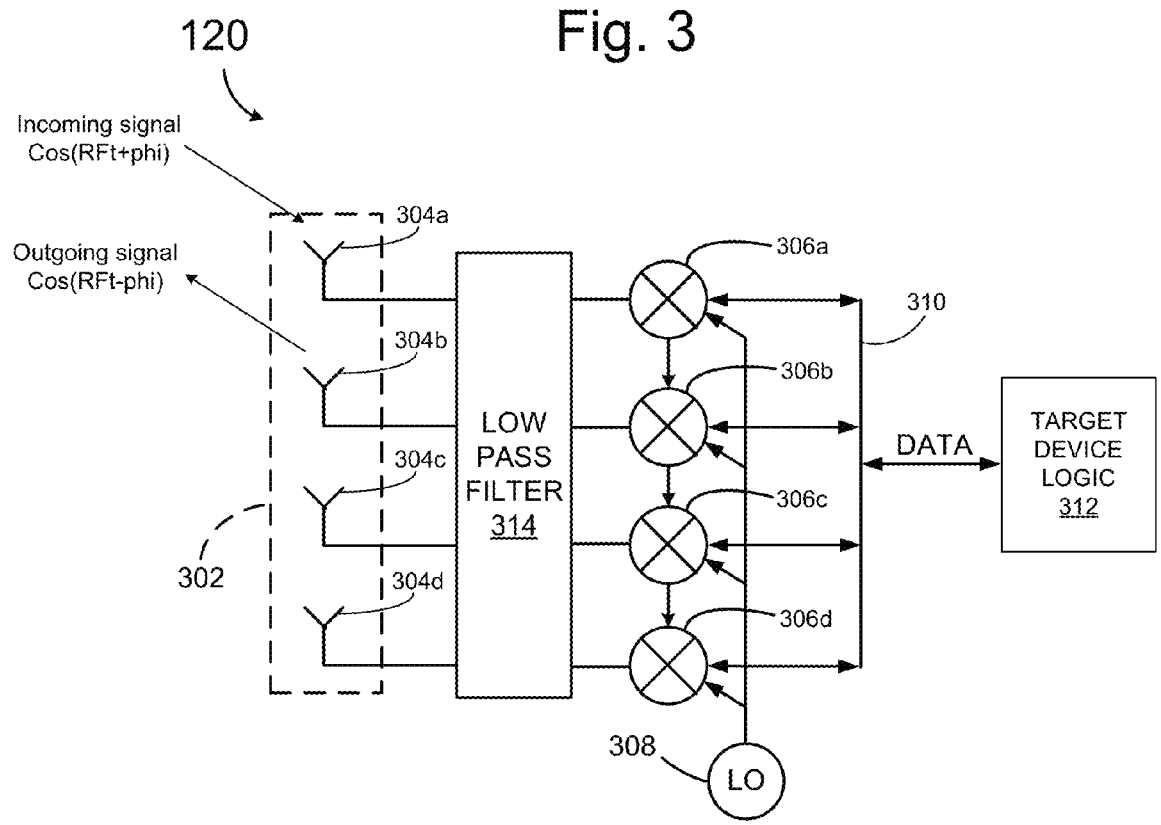
FIG. 3 illustrates a block diagram of one embodiment of a retro-directive antenna array employed in the target device of FIG. 1.

Referring now to FIG. 3, one embodiment of the antenna interface 120 of the target device 104 includes a special form of reflective phased array antenna capable of reflecting a received signal back to the signal source. In one embodiment, a retro-directive array 302 is employed that includes an array of antenna elements 304a-d configured similar to that of the console antenna 112, with a geometric layout optimized for a desired directivity parameter. Unlike the fully steerable console antenna, the retro-directive array employs active phase conjugation circuitry for returning the signal to opposite of its arrival direction. An exemplary phase conjugation circuitry is shown in the form of respective mixers 306a-d that each tie-in to a local oscillator 308. Data distribution circuitry 310 couples the mixers to target device logic 312. In one embodiment, the target device logic 312 comprises a low-power processing engine that operates at a relatively low data rate. Like the console antenna, signals received at each antenna element are offset by a phase that is a function of direction of the received beam. In the exemplary implementation, by setting the local oscillator frequency to twice the incoming RF carrier frequency, the antenna reflects an incoming signal back to the signal source in accordance with the following approximations:

$$V_{out} = V_{in}\cos(\omega_{RF}t+n\phi) \times V_{LO}\cos(2\omega_{RF}t) = 1/2 V_{in} V_{LO} \cos(\omega_{RF}t-n\phi) + 1/2 V_{in} V_{LO} \cos(3\omega_{RF}t+n\phi)$$

The second component of the expanded equation may be discarded using filtering since its center frequency is a harmonic of the leading component center frequency. The result is an automatic phase conjugation of the incoming signal that essentially redirects the incoming signal back from where it originated.

The target device also includes circuitry to modulate the reflected signal, thus enhancing the signal's detectability at the tracking device. In one embodiment, the modulator circuitry is in the form of a frequency offset in the reflected beacon signal in compare to incoming signal. Other forms of modulation may be possible, including the phase or the amplitude of the reflected signal, and their combination. As explained in further detail below, the modulation applied to the reflected signal enables the reflected signal to stand out from interfering reflections from, for example, background walls or other objects.

By employing straightforward reflection circuitry such as a retro-directive array in the target device antenna interface, complex and power-hungry operations involving "receiving" a signal are avoided. This allows for the use of low-power and low-cost circuitry at the target device.

In one specific embodiment, calibration uplink circuitry is provided in the transceiver interface to enable receipt of a modulation value to be applied to the active filter based on a calibration operation described below.

In operation, the wireless tracking system 100 takes advantage of the observation that signals reflected from a target that are modulated versions of the incoming signal are more easily detectable in the presence of interfering reflections and noise. Moreover, by employing a form of modulation on the incoming signal, intentional differences in round trip flight time will be detected in an implementation using LFM, corresponding to higher measurement sensitivity by separating the reflection by target from other reflections. Further, by avoiding the use of power-hungry high resolution digital circuitries that are normally used for power-detection schemes, significant power savings are realized.

Figure 4:
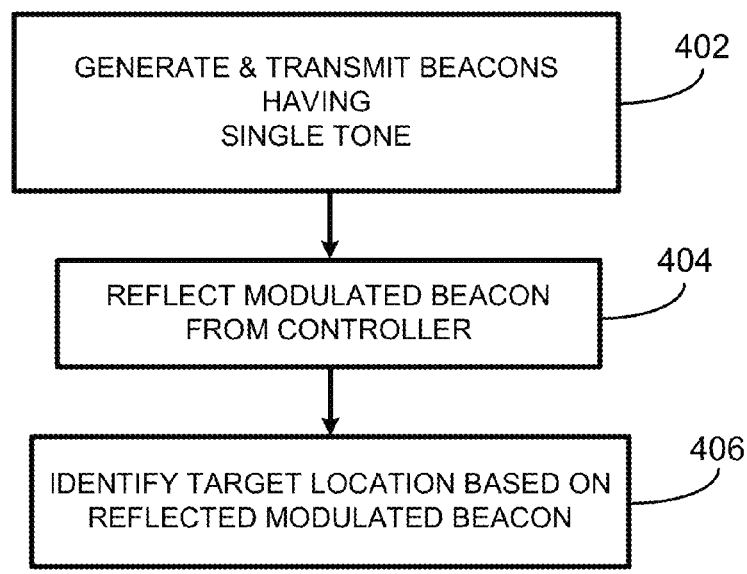
FIG. 4 illustrates a high-level flow diagram of a method of searching for a target device based on modulated reflected beacon information received from the target device.

In one embodiment, high-level operations between the tracking device 102 and the target device 104 are set out by the flowchart of FIG. 4. Generally, the tracking device 102 carries out a search algorithm that involves iteratively generating and transmitting a plurality of beacons having different directions, but for any instant of time, a single tone (or frequency), at step 402. In some embodiments, the beacons are then modulated in accordance with a modulation scheme, such as LFM or pulse modulation (described below) that enables the processing resources to determine target device locations. Beacons that are transmitted within a range of directions corresponding to a line-of-sight path intersecting the target device 104 (within the echo zone 124) are reflected back to the tracking device 102 by the target device antenna 122, at step 404, and as they are reflected, undergo a modulation at the target device. The tracking device then discriminates between the modulated reflected beacon and spurious interfering reflections in an effort to identify the target location, at step 404. In this way, tracking based on frequency detection may be realized, which provides a high level of detection sensitivity with lower power dissipation.

FIGS. 5a-5d illustrate graphical representations of respective transmitted and reflected beacons. An LFM-modulated transmit beacon is shown in FIG. 5a, with a changing linear frequency between respective minimum and maximum frequency values $F_{MIN}$ and $F_{MAX}$ plotted against time t. The frequency modulation resets every interval T, such that the waveform takes on a sawtooth (or triangular) shape in the frequency domain.

Referring now to FIG. 5b, a beacon reflection waveform is shown that does not include any modulation offset from the target device. This is useful to view as a baseline from which to compare a modulated reflection waveform discussed below, and shown in FIG. 5d. The reflected unmodulated waveform generally mirrors the transmit waveform, but delayed in time by an amount ΔT. The time delay indicates the complete round-trip flight-time of the signal from the tracking device to the target device, and indicates the relative proximity between the two devices. One of the benefits to utilizing an LFM modulation for the transmit beacon is the improved manner in which the proximity can be detected through an evaluation of ΔT.

Although utilizing the LFM-modulated transmit beacon allows for easier proximity determinations, background reflections may still pose a problem. This is shown in FIG. 5c, which illustrates a background reflection from, for example, a wall behind the target device. Aside from a very slight time delay Δt, the waveform is virtually identical to the unmodulated reflected beacon of FIG. 5b.

With reference now to FIG. 5d, a modulated beacon reflection is shown that exhibits an almost identical waveform to those of FIGS. 5b and 5c, except for a frequency offset of Δf. This frequency offset, when received at the tracking device, provides a highly detectable way to discriminate between interfering background reflections.

Figure 6:
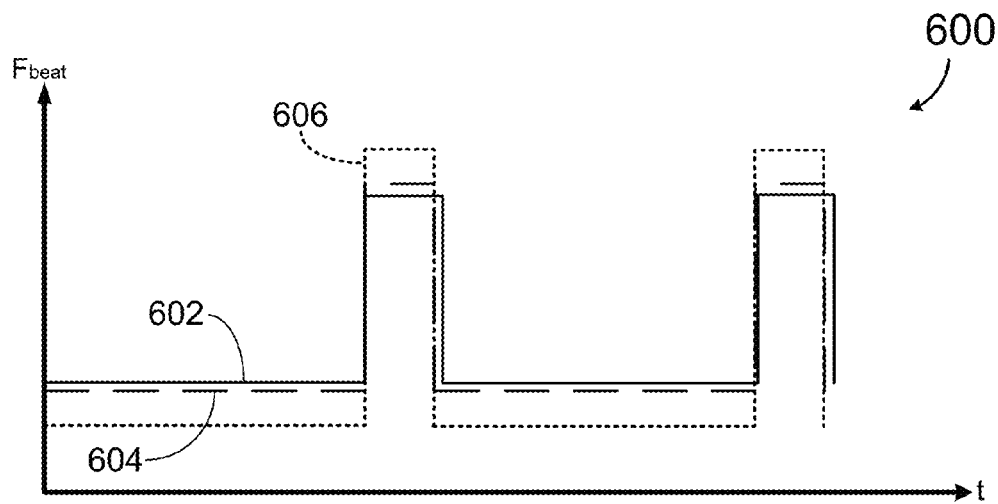
FIG. 6 illustrates a further graphical representation of overlaid received beacon reflections upon mixing at the tracking device receiver.

FIG. 6 illustrates the reflected waveforms of FIGS. 5b-5d after mixing at the tracking device receiver circuitry to form respective waveforms with beat frequency as a function of time. The solid line at 602 represents a background reflection, while the dashed waveform at 604 represents what an unmodulated beacon reflection from the target device would look like. The dotted waveform, at 606, represents the modulated reflected waveform. Having the modulated frequency shift provides the processor resources with a much easier way to differentiate between the actual and interfering reflection waveforms.

Figure 7:
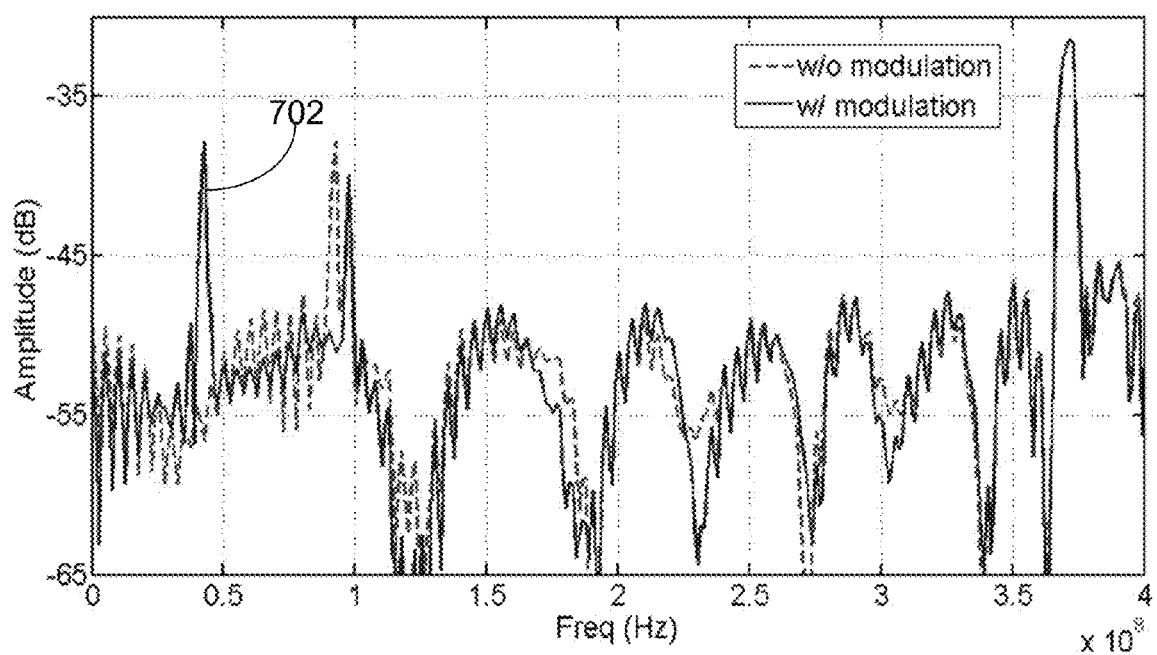
FIG. 7 illustrates received beacon reflections according to one embodiment in the presence of background noise.

Referring now to FIG. 7, a further advantage of modulating the beacon reflection signal involves increasing the likelihood that the "first returned" reflection is that of the target device reflection. The graph of FIG. 7 plots signal amplitude in dB versus frequency. As a result of the modulated frequency shift applied to the beacon reflection, the reflection from the target shifts to a virtual frequency that becomes the first detected reflection, at 702.

In one embodiment, the modulation parameters are optimized in an initialization or calibration process. FIG. 8 sets forth a high-level flowchart illustrating steps involved in the calibration process. At 802, the tracking device (such as the game console) and the target device (such as the game controller) are placed in a calibration mode. In one specific embodiment, this involves shutting off or gating reflections from the controller in order to monitor the extent of any background interference. One or more beacons are then generated and transmitted, at 804. Background reflections are then received and processed to determine the distances of the background echo sources, at 806. With knowledge of the location of the background interferors, the target device modulation value may be set to cause a "virtual" shift in the controller location to a point much closer to the tracking device, or much further from the tracking device. Either way, the reflected beacon from the target device becomes enhanced in comparison to the background reflections.

Further referring to FIG. 8, once the modulation value is determined, it may be uplinked to the controller through the calibration uplink channel. Once the modulation value is programmed into the controller, the console and controller may be placed in a normal operation mode, at 810. During normal operation, the modulation value is utilized to modulated the beacon reflections, at 812.

Using millimeter-waves for communicating between the tracking and target devices described herein provides for relatively high antenna gain in dimensions on the millimeter scale. Millimeter-waves are broadly defined as in the 30 GHz-300 GHz range. The short wavelength allows very fine angular resolution for position detection and tracking. Moreover, from a regulatory perspective, a wide unlicensed bandwidth on the order of 7 GHz (centered at 60 GHz) is conveniently available for game play. Using this spectrum a range resolution on the order of around 1-2 inches is achievable using straightforward Fast Fourier Transform (FFT) techniques. Further advantages with millimeter-wave signaling involve, for example, low multi-path effects, efficient post-processing schemes and robust detection methods.

Figure 9A:
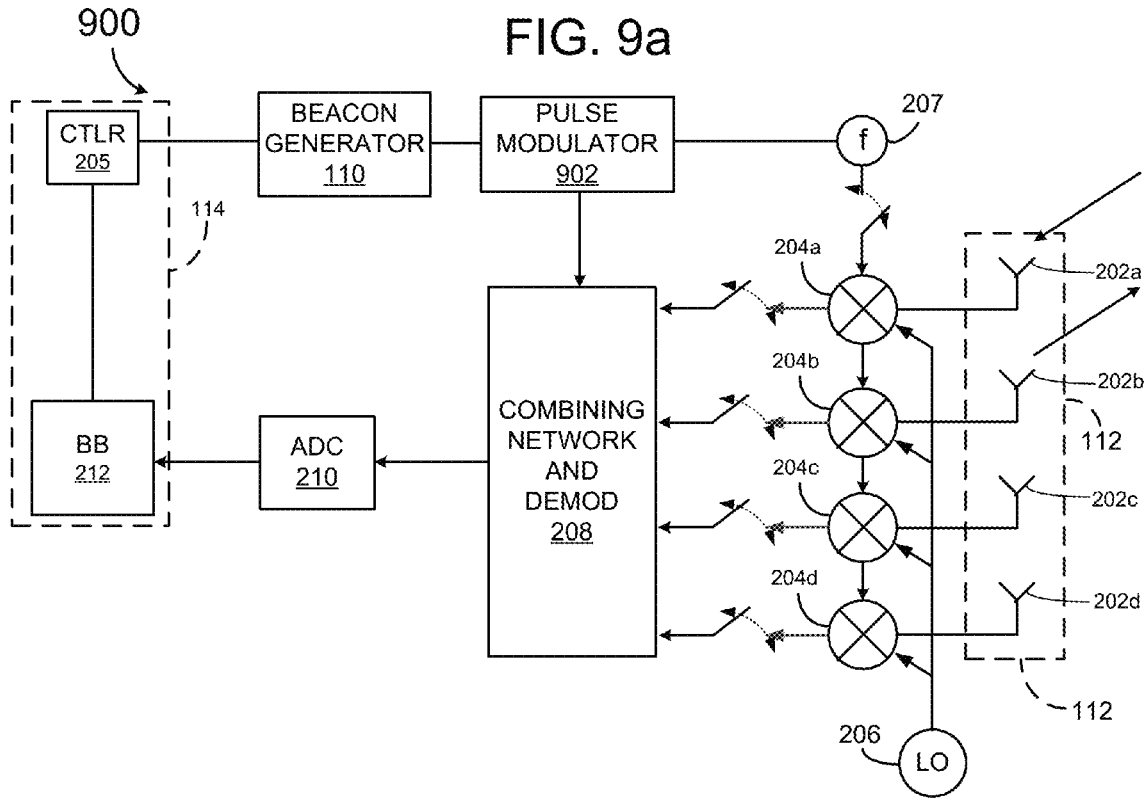
FIG. 9a illustrates a further embodiment of a transceiver and antenna interface circuit similar to FIG. 2a, but utilizing pulse modulation.

FIG. 9a illustrates an alternative embodiment of a transceiver circuit and antenna interface, generally designated 900, for use with a wireless tracking device similar to that illustrated in FIG. 2a. The alternative transceiver circuit and antenna interface employs the capability to modulate the beacon signal in accordance with a pulse modulation instead of an LFM system. Pulse modulation provides an ultra-low power form of signaling that may be preferable to LFM modulation, depending on the application. Generally, in pulse modulation, pulses are generated in baseband, and mixed with a single-tone frequency f. The circuit 900 includes similar circuitry to that of FIG. 2a, employing a plurality of mixers 204a-204d that are respectively coupled to the plurality of antenna elements 202a-202d. The mixers 204a-d are coupled to a local oscillator 206 that generates a local oscillator signal at an oscillation frequency $f_{LO}$. A reference signal generator 207 produces a reference signal having a frequency $f_0$ and feeds the signal to the mixers in a manner similar to the local oscillator signal, but phase-shifted by a controlled amount to each mixer.

With continued reference to FIG. 9a, the reference signal generator receives modulated beacon signals from a pulse modulator 902. The modulator takes beacon signals generated by the beacon generator 110, and modulates them by mixing a carrier frequency with the generated pulses. Like the LFM modulation scheme discussed previously, modulating in a pulsed mode allows for greater accuracy in detecting reflected beacons.

As explained above, during transmission modes of operation, the mixers 204a-d are coupled to the beacon generator 110 via the pulse modulator 902. The beacon generator generates beacons and directional components in response to a controller circuit 205 that in one embodiment forms a portion of the processor resources 114 of FIG. 1. For reflected beacon reception, the mixers 204a-d combine the received RF carrier signal with the local oscillation signal $f_{LO}$ to generate a signal exhibiting an intermediate frequency $f_{IF}$ that may be of a lower frequency than the carrier frequency, such as a beat frequency of the carrier frequency and local oscillator frequency, and thus more easily handled from a processing standpoint.

With continued reference to FIG. 9a, in one embodiment the mixers 204a-d are selectively coupled to a combining network 208, depending on whether the antenna is operating in a transmit or receive mode. The combining network in a receive mode, generally takes the intermediate frequency receive signals from the mixers 204a-d, and combines the separate phase components from the different antenna elements into a composite waveform based on calibration coefficients stored in a memory, such as a look-up table, or data storage 116. The target device reflections are then discriminated from the background reflections, and demodulated from the pulse modulation scheme for further processing. In a transmit mode, the combining network 208 receives directional components from the beacon generator and acts to effectively steer the orientation of signal transmission by assigning a different phase angle offset to signals transmitted by each of the antenna elements 202a-d. In some embodiments, the combining network 208 may be simplified or altogether omitted by including circuitry within the mixers 204a-d to carry out the phase shifting functionality.

Disposed at a receive output of the combining network 208 is an analog-to-digital converter (ADC) 210 to convert the demodulation reflections into digital data streams for processing by the processor resources. The ADC includes an input for receiving waveforms representing reflected beacon signals and an output signal to a baseband processor (BB) 212. The baseband processor 212 may be realized by the processing circuitry resources 114 described earlier and coupled to the controller circuit 205.

Figure 9B:
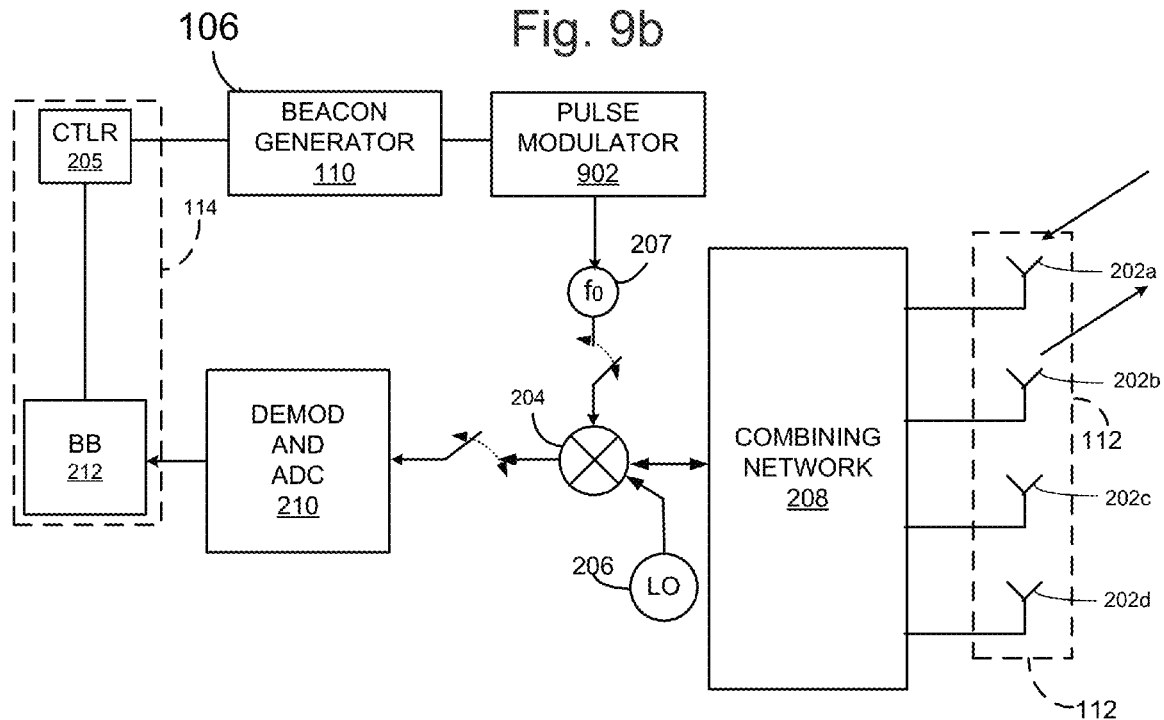
FIG. 9b illustrates an additional embodiment of a transceiver and antenna circuit.

In FIG. 9b, a similar implementation to that of FIG. 2b can be used where only one mixer is used and the combining network performs the phase shifting operation.

The transceiver and antenna interface of FIGS. 9a and 9b are able to communicate straightforwardly with the target interface described earlier and illustrated in FIG. 3. The modulation circuitry to, for example, create an offset in frequency in the reflected beacon may be utilized for the pulse modulation embodiment described above with very little modifications.

Figure 10:
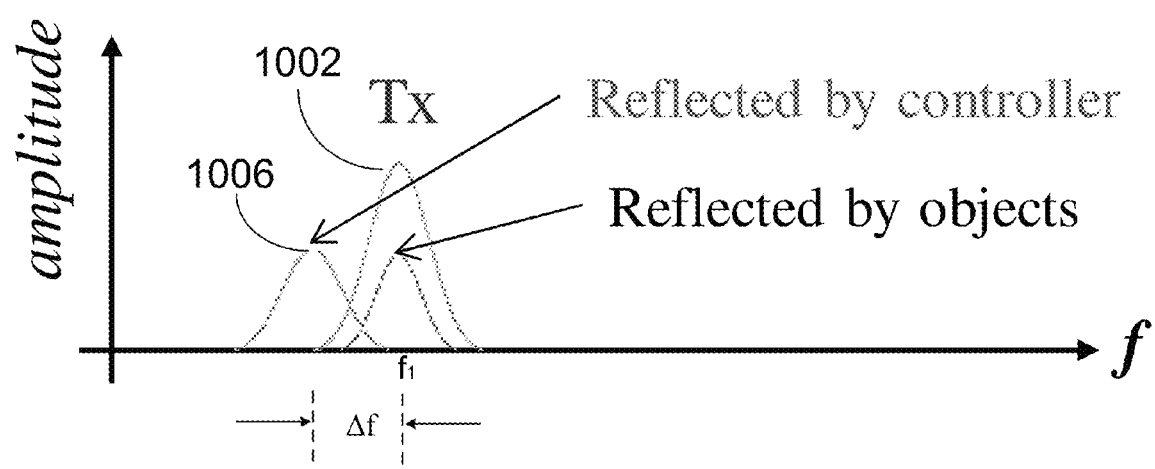
FIG. 10 illustrates received beacon reflections at the interface of either FIG. 9a or FIG. 9b in the presence of background noise.

FIG. 10 illustrates a graph plotting signal amplitude versus frequency. Respective transmit and reflection beacons are superimposed on the graph to illustrate the enhanced detectability of the modulated reflection beacon in comparison to background echoes. The transmit beacon, at 1002, exhibits a strong amplitude that peaks at a given frequency or tone $f_1$. Background reflections, such as that represented by waveform 1004, exhibit the same frequency as the transmit beacon, but with an attenuated amplitude. As a result of the target device modulation, the frequency of the modulated reflected beacon, at 1006, is offset from f1 by an amount $\Delta f$, thus improving the detectability of the signal.

It should be noted that the various circuits disclosed herein may be described using computer aided design tools and expressed (or represented), as data and/or instructions embodied in various computer-readable media, in terms of their behavioral, register transfer, logic component, transistor, layout geometries, and/or other characteristics. Formats of files and other objects in which such circuit expressions may be implemented include, but are not limited to, formats supporting behavioral languages such as C, Verilog, and VHDL, formats supporting register level description languages like RTL, and formats supporting geometry description languages such as GDSII, GDSIII, GDSIV, CIF, MEBES and any other suitable formats and languages. Computer-readable media in which such formatted data and/or instructions may be embodied include, but are not limited to, non-volatile storage media in various forms (e.g., optical, magnetic or semiconductor storage media) and carrier waves that may be used to transfer such formatted data and/or instructions through wireless, optical, or wired media or any combination thereof. Examples of transfers of such formatted data and/or instructions by carrier waves include, but are not limited to, transfers (uploads, downloads, e-mail, etc.) over the Internet and/or other computer networks via one or more data transfer protocols (e.g., HTTP, FTP, SMTP, etc.).

When received within a computer system via one or more computer-readable media, such data and/or instruction-based expressions of the above described circuits may be processed by a processing entity (e.g., one or more processors) within the computer system in conjunction with execution of one or more other computer programs including, without limitation, net-list generation programs, place and route programs and the like, to generate a representation or image of a physical manifestation of such circuits. Such representation or image may thereafter be used in device fabrication, for example, by enabling generation of one or more masks that are used to form various components of the circuits in a device fabrication process.

In the foregoing description and in the accompanying drawings, specific terminology and drawing symbols have been set forth to provide a thorough understanding of the present invention. In some instances, the terminology and symbols may imply specific details that are not required to practice the invention. For example, any of the specific numbers of bits, path widths, processing or operating frequencies, component circuits or devices and the like may be different from those described above in alternative embodiments. Also, the interconnection between circuit elements or circuit blocks shown or described as multi-conductor links may alternatively be single-conductor links, and single conductor links may alternatively be multi-conductor links. Links and signaling paths shown or described as being single-ended may also be differential, and vice-versa. Similarly, links described or depicted as having active-high or active-low logic levels may have opposite logic levels in alternative embodiments. Component circuitry within integrated circuit devices may be implemented using metal oxide semiconductor (MOS) technology, bipolar technology or any other technology in which logical and analog circuits may be implemented. With respect to terminology, a signal is said to be "asserted" when the signal is driven to a low or high logic state (or charged to a high logic state or discharged to a low logic state) to indicate a particular condition. Conversely, a signal is said to be "deasserted" to indicate that the signal is driven (or charged or discharged) to a state other than the asserted state (including a high or low logic state, or the floating state that may occur when the signal driving circuit is transitioned to a high impedance condition, such as an open drain or open collector condition). A signal driving circuit is said to "output" a signal to a signal receiving circuit when the signal driving circuit asserts (or deasserts, if explicitly stated or indicated by context) the signal on a signal line coupled between the signal driving and signal receiving circuits. A signal line is said to be "activated" when a signal is asserted on the signal line, and "deactivated" when the signal is deasserted. The term "coupled" is used herein to express a direct connection as well as a connection through one or more intervening circuits or structures. Integrated circuit device "programming" may include, for example and without limitation, loading a control value into a register or other storage circuit within the device in response to a host instruction and thus controlling an operational aspect of the device, establishing a device configuration or controlling an operational aspect of the device through a one-time programming operation (e.g., blowing fuses within a configuration circuit during device production), and/or connecting one or more selected pins or other contact structures of the device to reference voltage lines (also referred to as strapping) to establish a particular device configuration or operation aspect of the device. The term "exemplary" is used to express an example, not a preference or requirement.

While the invention has been described with reference to specific embodiments thereof, it will be evident that various modifications and changes may be made thereto without departing from the broader spirit and scope of the invention. For example, features or aspects of any of the embodiments may be applied, at least where practicable, in combination with any other of the embodiments or in place of counterpart features or aspects thereof. Accordingly, the specification and drawings are to be regarded in an illustrative rather than a restrictive sense.

We claim:

1. A method of calibrating modulation parameters in a beacon signal transmitted by a first electronic device configured for tracking a second electronic device, the method comprising:
    generating, by the first electronic device, a calibration directional beacon;
    transmitting the calibration directional beacon from the first electronic device;
    receiving background reflections of the calibration directional beacon;
    processing the received background reflections of the calibration directional beacon to determine one or more distances of background echo sources from the first electronic device; and causing a target device to set a modulation value based on determined locations, the modulation value set to enable the first electronic device to distinguish a modulated beacon received from the target device from background reflections of a subsequent directional beacon, the modulated beacon modulated based on the modulation value.

2. The method according to claim 1 and further comprising:

modulating the calibration directional beacon in accordance with a linear frequency modulation method.

3. The method according to claim 1 further comprising:

modulating the calibration directional beacon in accordance with a pulse modulating method.

4. The method of claim 1, further comprising:

generating, by the first electronic device, the subsequent directional beacon;

transmitting the subsequent directional beacon from the first electronic device;

receiving the modulated beacon corresponding to the transmitted beacon;

processing the received modulated beacon to discriminate between the background reflections of the subsequent directional beacon and the modulated beacon.

5. The method of claim 1, wherein the modulated beacon comprises a frequency offset from the subsequent directional beacon.

6. An electronic reader device for tracking an electronic target device, the electronic reader device comprising:

a beacon generator to generate a calibration directional beacon;

an antenna array to transmit the calibration directional beacon and to receive background reflections of the calibration directional beacon;

processing circuitry to process the received background reflections of the calibration directional beacon to determine one or more distances of background echo sources from the electronic reader device and to cause the electronic target device to set a modulation value based on determined locations, the modulation value set to enable the first electronic device to distinguish a modulated beacon received from the target device from background reflections of a subsequent directional beacon, the modulated beacon modulated based on the modulation value.

7. The electronic reader device of claim 6, wherein the beacon generator is further configured to generate the subsequent directional beacon;

the antenna array is further configured to transmit the subsequent directional beacon from the electronic reader device and receives the modulated beacon corresponding to the transmitted beacon;

the processing circuitry is further configured to process the received modulated beacon to discriminate between the background reflections of the subsequent directional beacon and the modulated beacon.

8. The electronic reader device of claim 6, wherein the modulated beacon comprises a frequency offset from the subsequent directional beacon.

9. The electronic reader device of claim 6, further comprising:

modulation circuitry to modulate the calibration directional beacon in accordance with a transmit linear frequency modulation method.

10. The electronic reader device of claim 6, further comprising:

modulation circuitry to modulate the calibration directional beacon in accordance with a pulse modulating method.

11. A tracking system comprising:

a reader device comprising:

a beacon generator to generate a calibration directional beacon;

an antenna array to transmit the calibration directional beacon and to receive background reflections of the calibration directional beacon; and processing circuitry to process the received background reflections of the calibration directional beacon to determine one or more distances of background echo sources from the first electronic device and to generate a modulation value based on determined locations; and a target device comprising:

a transceiver circuit to receive the modulation value from the reader device, to receive a subsequent directional beacon from the reader device, to modulate the subsequent directional beacon according to the modulation value to generate a modulated beacon and to transmit the modulated beacon to the reader device.

12. The tracking system of claim 11, wherein the beacon generator is further configured to generate the subsequent directional beacon;

the antenna array is further configured to transmit the subsequent directional beacon from the first electronic device and receives the modulated beacon corresponding to the transmitted beacon; and the processing circuitry is further configured to process the received modulated beacon to discriminate between the background reflections of the subsequent directional beacon and the modulated beacon.

13. The tracking system of claim 11, wherein the modulated beacon comprises a frequency offset from the subsequent directional beacon.

14. The tracking system of claim 11, wherein the reader device further comprises:

modulation circuitry to modulate the calibration directional beacon in accordance with a transmit linear frequency modulation method.

15. The tracking system of claim 11, wherein the reader device further comprises:

modulation circuitry to modulate the calibration directional beacon in accordance with a pulse modulating method.

* * * * *